United States Patent [19]
Horie et al.

[11] Patent Number: 6,069,786
[45] Date of Patent: May 30, 2000

[54] LAMINATED CAPACITOR AND TRIMMING METHOD THEREOF

[75] Inventors: Katsuyuki Horie; Koichiro Tsuzuku, both of Tokyo, Japan

[73] Assignee: Taiyo Yuden Co., Ltd., Tokyo, Japan

[21] Appl. No.: 09/022,701

[22] Filed: Feb. 12, 1998

[30] Foreign Application Priority Data

Feb. 24, 1997 [JP] Japan ..................................... 9-055561

[51] Int. Cl.⁷ .............................. H01G 4/12; H01G 4/228
[52] U.S. Cl. ...................... 361/303; 361/306.1; 361/309; 361/306.3; 361/329; 29/25.42
[58] Field of Search ................................. 361/303, 306.1, 361/306.3, 308.1, 309, 311–313, 321.1–321.5, 329, 330; 29/25.41, 25.42

[56] References Cited

U.S. PATENT DOCUMENTS

| | | | |
|---|---|---|---|
| 4,905,358 | 3/1990 | Einbinder | 29/25.42 |
| 5,159,524 | 10/1992 | Hasegawa et al. | 361/271 |
| 5,345,361 | 9/1994 | Billotte et al. | 361/313 |
| 5,347,423 | 9/1994 | DeNeuf et al. | 361/313 |
| 5,894,401 | 4/1999 | Asakura et al. | 361/303 |

FOREIGN PATENT DOCUMENTS

| | | |
|---|---|---|
| 2-185007 | 7/1990 | Japan . |
| 5-190379 | 7/1993 | Japan . |
| 7-045469 | 2/1995 | Japan . |
| 7-45469 | 2/1995 | Japan . |
| 7-183162 | 7/1995 | Japan . |

*Primary Examiner*—Kristine Kincaid
*Assistant Examiner*—Anthony Dinkins
*Attorney, Agent, or Firm*—Fynn, Thiel, Boutell & Tanis, P.C.

[57] ABSTRACT

In a laminated capacitor, internal electrodes formed within a naked laminated body oppose a trimming electrode formed on a surface of the naked laminated body so as to obtain an electrostatic capacity, and the internal electrodes differ from one another in area opposed to the trimming electrode. By removing the trimming electrode from a portion where it is opposed to more of the internal electrodes toward another portion where it is opposed to less of the internal electrodes, the rate of decrease in electrostatic capacity with respect to the area of the trimming electrode is large at an initial stage of the trimming process and it gradually reduces in accordance with the progress thereof. Further, when the electrostatic capacity becomes to small through too much trimming, an adjusting layer between the trimming electrode and the internal electrode is deoxidized in a part thereof so that the portion of the adjusting layer is turned conductive to increase the electrostatic capacity thereof.

15 Claims, 6 Drawing Sheets

(a)

(b)

LAMINATED CAPACITOR AND TRIMMING METHOD THEREOF

BACKGROUND OF THE INVENTION

1. Field of the Invention

The present invention relates to a laminated capacitor including external electrodes attached at both edge portions of a principal or naked laminated body and a method of such the capacitor for adjusting electrostatic capacity thereof by trimming, and in particular to a trimming method for a laminated ceramic capacitor for use in a resonance circuitry requiring a finely adjusted value of electrostatic capacitance.

2. Description of Related Art

Most laminated capacitors are made of chip-like naked ceramic bodies of a prism and plate shapes, on both edge surfaces of which are attached with terminals for electrical connection, i.e., external electrodes. Among circuit parts of the laminated type, in particular, a laminated capacitor for use in a resonance circuit and a filter, etc., is finely and accurately adjusted in characteristics thereof, by means of, so-called a functional trimming, after it is mounted on a circuit board, especially for adjustment of the frequency characteristic thereof.

FIG. 8 attached shows a laminated ceramic capacitor disclosed in Japanese Patent Laid-Open No. Hei 7-183162 (1995), and it is one of the laminated ceramic capacitors to be adjusted in the capacitance thereof by trimming as mentioned above.

This laminated capacitor has at least a pair of internal electrodes 3 and 3 confronting each other within the naked laminated body 1 of a ceramic laminated body, and those internal electrodes 3 and 3 extend out at the edge surfaces of the naked laminated body 1. The external electrodes 2 and 2 are formed at the edge portions of the naked laminated body 1. The naked laminated body 1, being under the condition that it is separated from the external electrodes 2 and 2, is formed with a trimming electrode 4 on a surface thereof.

With this capacitor, it can be represented by an equivalent circuit of a series connection of capacities which are formed among the pair of internal electrodes 3 and 3 and the trimming electrode 4. This capacitor is designed and produced in such a manner that it has an electrostatic capacitance a little bit larger than a predetermined value, and the capacitance is adjusted to decrease by gradually removing the trimming electrode 4 by irradiation of a laser beam, i.e., by reducing the opposing area defined between the trimming electrode 4 and the internal electrode 3, after it is mounted on the circuit board. Thereby, the capacitance is so adjusted that the resonance frequency is fitted within a predetermined boundary value.

FIG. 9 shows a trimming method of the laminated ceramic capacitor shown in Japanese Patent Laid-Open No. Hei 7-45469 (1995).

Among layers of the naked laminated body 1 formed of a dielectric ceramic material, a plurality of pairs of internal electrodes 6 and 7 are formed so as to oppose each other through the ceramic layers. The internal electrodes 6 and 7 of each pair extend out to the opposing edge surfaces of the naked laminated body 1, respectively, and are connected to the external electrodes 2 and 2 which are formed at respective edge portions of the naked laminated body 1.

In such a laminated capacitor, the opposing area between the internal electrodes 6 and 7 is reduced so as to decrease the capacitance value, by removing a part of the naked laminated body 1 and cutting a portion of the internal electrodes 6 and 7 with the irradiation of the laser beam on the surface thereof. Thereby, the capacitance is so adjusted that the resonance frequency is fitted within a predetermined boundary value.

For improving the efficiency in a production process and in a trimming accuracy with the laminated capacitor mentioned above, at an initial stage of the trimming process in which there is great difference between the actual value in capacitance and the target value thereof, it is desired to reduce the electrostatic capacity abruptly. However, at a final stage of the trimming process in which the actual capacitance value approaches the target value, to reduce the value of electrostatic capacity slowly. Namely, it is preferable to adjust the capacitance roughly at the initial stage of the trimming process and to adjust it finely at the final stage thereof.

However, with the laminated capacitor as mentioned above, the value of the electrostatic capacity decreases almost linearly depending on the decrease in the opposing area of the trimming electrode, since the proportion or rate of reduction in the opposing area of the trimming electrode is almost proportional to that of the value of the electrostatic capacity. Therefore, it is impossible to fulfill both requirements, i.e., the improvement in efficiency of the trimming process as well as in the trimming accuracy.

Further, with the laminated capacitor mentioned above, it is impossible to adjust the electrostatic capacity value by increasing the value thereof since the trimming always functions only to decrease the electrostatic capacity value. Therefore, excessive trimming is not permissible and it cannot be recovered afterward. Furthermore, even when the laminated capacitor produced has an electrostatic capacity value which is only slightly smaller than the designed value due to some reasons, it must be destroyed or disposed of since the electrostatic capacity value of it cannot be brought up to the target value thereof. Therefore, there are drawbacks that the yield rate or factor of the products becomes to be low and brings troubles in that the laminated capacitor must be removed for replacement thereof.

SUMMARY OF THE INVENTION

The present invention is achieved for removing the drawbacks in the conventional trimming technology for such the laminated capacitor.

A first object according to the present invention is to provide a laminated capacitor and a trimming process thereof, in which the proportion or rate of decrease in the electrostatic capacity value of the laminated capacitor is greater than that of the reduction in the area of the trimming electrode, at the initial stage of trimming, thereby enabling an abrupt or sharp decrease in the electrostatic capacity value, on the other hand, at the final stage of trimming when approaching the target value of the electrostatic capacity, the rate of decrease in the electrostatic capacity value of the laminated capacitor is smaller than that of the reduction in the area of the trimming electrode, thereby enabling a slow dull decrease in the electrostatic capacity value. Namely, the object is to provide a laminated capacitor and a trimming process thereof, with which the rough and fine adjustment in the capacitance thereof is possible, thereby achieving an improvement of the efficiency in the trimming process as well as an improvement in the trimming accuracy thereof.

A second object in accordance with the present invention is to provide a laminated capacitor and a trimming process thereof, in which the value of the electrostatic capacity can be adjusted by the trimming, not only in a direction of decreasing but also in a direction of increasing the electrostatic capacity value.

According to the present invention, for accomplishing the first object mentioned above, there is provided a laminated capacitor, wherein a plurality of internal electrodes 18a, 18b, 18c formed within a naked laminated body 13 oppose a trimming electrode 19 formed on a surface of the naked laminated body 13 so as to obtain the electrostatic capacity, and the plurality of internal electrodes 18a, 18b, 18c differ from one another in area opposite to the trimming electrode 19. With such a construction, by removing the trimming electrode 19 in trimming the process, from a portion where it is opposing more of the internal electrodes 18a, 18b, 18c toward another portion where it is opposing the less of the internal electrodes 18a, 18b, 18c, a rough adjustment in the initial stage of the trimming process can be achieved, in which the electrostatic capacity is decreased at a large proportion or rate with respect to that of the reduction in the area of the trimming electrode 19, as well as the fine adjustment in accordance with the progress of the trimming process, in which the electrostatic capacity is decreased at a small proportion or rate with respect to that of the reduction in the area of the trimming electrode 19. Thereby, an improvement of the efficiency in the trimming process and improvement in the trimming accuracy can be obtained.

Namely, in accordance with the present invention, there is provided a laminated capacitor having a naked laminated body 13 including internal electrodes and at least a pair of external electrodes 14 attached at end portions of said naked laminated body 13, comprising:

a plurality of adjusting internal electrodes 18a, 18b, 18c formed within said naked laminated body 13 and connected to one of said pair of external electrodes 14; and a trimming electrode 19 formed on or in vicinity of a surface of said naked laminated body 13 opposing said plurality of adjusting internal electrodes 18a, 18b, 18c and connected to the other of said pair of external electrodes 14, wherein said plurality of adjusting internal electrodes 18a, 18b, 18c differ from one another in the area thereof opposing said trimming electrode 19, respectively.

Further, according to the present invention, there is provided a laminated capacitor having a naked laminated body 13 including internal electrodes and a plurality of external electrodes 14 attached at end portions of said naked laminated body 13, comprising:

a plurality of adjusting internal electrodes 18a, 18b, 18c formed within said naked laminated body 13 and connected to one of said plurality of external electrodes 14 and 14;

a plurality of adjusting internal electrodes 18a, 18b, 18c formed within said naked laminated body 13 and connected to another of said plurality of external electrodes 14 and 14; and a trimming electrode 19 formed on or in the vicinity of a surface of said naked laminated body 13 opposing said plurality of adjusting internal electrodes 18a, 18b, 18c and insulated from said plurality of external electrodes 14 and 14, wherein said plurality of adjusting internal electrodes 18a, 18b, 18c differ from one another in the area thereof opposing to said trimming electrode 19, respectively.

In a case of trimming the laminated capacitor, said trimming electrode 19 is removed in a direction from a portion where it opposes more of said adjusting internal electrodes 18a, 18b, 18c toward another portion where it opposes less of said adjusting internal electrodes 18a, 18b, 18c.

With the trimming process of the trimming electrode 19 in such a manner as mentioned above, since the portion of the trimming electrode where it opposes more of said adjusting internal electrodes 18a, 18b, 18c is removed in the initial stage of the trimming process, the electrostatic capacity decreases at a large proportion or rate with respect to that of the reduction in the area of the trimming electrode 19, thereby enabling a rough adjustment. On the other hand, in accordance with the progress of the trimming process, the number of adjusting internal electrodes 18a, 18b, 18c opposing said trimming electrode 19 becomes smaller and the distance therefrom to said trimming electrode 19 also becomes farther, therefore, the electrostatic capacity decreases at a small proportion or rate with respect to that of the reduction in area of the trimming electrode 19, thereby enabling a fine adjustment.

As the most common measure for achieving the trimming process, it can be mentioned the irradiation of a laser beam upon said trimming electrode 19.

Here, by arranging said plurality of adjusting internal electrodes 18a, 18b, 18c opposing said trimming electrode 19 in such manner that the nearer to said trimming electrode 19, the narrower the area thereof, the proportion or rate of change in the electrostatic capacity with respect to the reduction in area of the trimming electrode 19 can be increased.

Further, said plurality of adjusting internal electrodes 18a, 18b, 18c are different from one another in either length or in width thereof, thereby, said plurality of adjusting internal electrodes 18a, 18b, 18c differ from one another in the area thereof opposing said trimming electrode 19, respectively.

It is preferable to form or laminate a protection layer 20 containing conductive material for forming said trimming electrode 19 and ceramic material for forming said naked laminated body 13 between said trimming electrode 19 and said naked laminated body 13. Thereby, the naked laminated body 13 can be prevented from being deoxidized due to the trimming by irradiation of the laser beam on the trimming electrode 19. If the naked laminated body 13 is deoxidized in the trimming process, it changes into a conductive body or semi-conductive body to cause a reaction in the insulating resistance, however, such a reduction in insulating resistance can be prevented by protecting the naked laminated body 13 from the deoxidation.

With the provision of internal electrodes 15 and 16 opposing each other without obtaining electrostatic capacity therebetween within said naked laminated body 13, together with said plurality of adjusting internal electrodes 18a, 18b, 18c, thereby, it is possible to include a capacitor having a fixed electrostatic capacity which is hardly influenced by the trimming of the trimming electrode 19.

For accomplishing the second object mentioned above, in accordance with the present invention, there is provided a trimming process, using a laminated capacitor having a trimming electrode 19 on or in vicinity of a surface of said naked laminated body 13 opposing at least a pair of internal electrodes 18a, 18b, 18c formed within said naked laminated body 13, wherein a portion of an adjusting layer 21 laminated between said trimming electrode 19 and said internal electrode 18 is deoxidized in a part thereof by irradiation of a laser beam on said trimming electrode 19. Thereby, said trimming electrode 19 and one of said internal electrodes 18 are short-circuited therebetween. With this trimming process, it is possible to adjust the electrostatic capacity of the laminated capacitor by increasing it.

Further, upon the irradiation of the laser beam, the adjusting layer 21 is removed and deoxidized by the irradiation of the same laser beam to be turned into the conductive body.

With this, the distance from the trimming electrode 19 to the opposing internal electrodes 18a, 18b, 18c is decreased substantially, thereby adjusting the electrostatic capacity of the laminated capacitor by decreasing it, in the same manner.

Namely, according to the present invention, a laminated capacitor having a naked laminated body 13 including internal electrodes 18a, 18b, 18c, external electrodes 14 attached at end surfaces of said naked laminated body 13, a trimming electrode 19 formed on or in vicinity of said naked laminated body 13 opposing at least a pair of internal electrodes 18a, 18b, 18c which are formed within said naked laminated body 13, and an adjusting layer 21 which is deoxidized by irradiation of a laser beam onto said trimming electrode 19 is provided between said trimming electrode 19 and said internal electrode 18a.

In a trimming process of this laminated capacitor, said adjusting layer 21 is deoxidized in a part thereof by the irradiation of the laser beam on said trimming electrode 19, thereby connecting between said adjusting layer 21 and said part of said internal electrode 18a. Then, the series connection of a pair of capacitors of the laminated capacitor through the trimming electrode 19 in the equivalent circuit thereof before the trimming process, is changed into a single capacitor, and the value of the conductance becomes about two times as large as that before the trimming. Namely, it is possible to achieve the trimming in a direction for increasing the electrostatic capacity. Because of this, when the electrostatic capacity comes to be excessively small due to a failure in the trimming process, or when the electrostatic capacity of a capacitor produced is smaller than the desired value in designing it, the electrostatic capacity thereof can be increased by trimming as above so as to recover it.

Moreover, in the trimming process of the laminated capacitor, it is also possible to achieve the trimming to increase the electrostatic capacity of the laminated capacitor by deoxidizing said adjusting layer 21 and removing it as well by the irradiation of the laser beam. Namely, when the adjusting layer 21 below the trimming electrode 19 on which the laser beam is irradiated is removed and deoxidized in a part thereof to be turned into a conductive body, the distance between said trimming electrode 19 and said internal electrodes 18a, 18b, 18c is narrowed substantially. Therefore, the electrostatic capacity of the laminated capacitor is increased. With this trimming process, in comparison with the above-mentioned trimming process in which said trimming electrode 19 and said the internal electrode 18a are connected to each other by short-circuiting therebetween, the electrostatic capacity value which can be increased thereby is small. Therefore, it is effective only in a case of no necessity for drastic increase in the electrostatic capacity value thereof.

For turning the adjusting layer 21 into the conductive body by the deoxidization thereof, it is effective that a valence controlling material is contained in a boundary surface between said trimming electrode 19 and said adjusting layer 21. Furthermore, the valence controlling material can be contained in the naked laminated body 13, in particular, in the portion of said adjusting layer in advance.

Further, after increasing the electrostatic capacity of the laminated capacitor in the manner mentioned above, it is also possible to remove said trimming electrode 19 by irradiating another laser beam thereon, which is smaller in output power than that of said laser beam for the trimming mentioned above, without deoxidizing said adjusting layer 21. Because of this, the opposing area between said trimming electrode 19 and said internal electrodes 18a, 18b, 18c without being conducted with said trimming electrode 19 is reduced, thereby, in contrast to above, enabling the adjustment in the electrostatic capacity to decrease the value thereof.

DESCRIPTION OF THE PREFERRED EMBODIMENTS

Hereinafter, detailed explanation of the embodiments according to the present invention will be given by referring to the attached drawings.

First of all, a ceramic slurry is prepared by dispersing a powder of a ceramic ingredient, such as $BaO$-$TiO_2$-$Nd_2O_3$, into an organic binder dissolved in a solvent with uniformity, then it is pasted on a base film of polyethylene terephthalate, etc., with a thin and uniform thickness and is dried to form a film-like ceramic green sheet therefrom. After this, the green sheet is cut into pieces of appropriate sizes.

Next, an internal electrode is printed on a surface of each of the cut green sheets. The green sheets printed with the internal electrode pattern are piled on one another, and further the green sheets printed with no internal electrode pattern, i.e., so-called dummy sheets are piled on both sides of it. They are pressed to be closely contacted to one another so as to obtain a laminated body therewith. The laminated body obtained is cut in vertical and horizontal directions to obtain each chip-like laminated body. Thereafter, by baking the laminated body, a principal or naked laminated body is formed.

Figure 3:
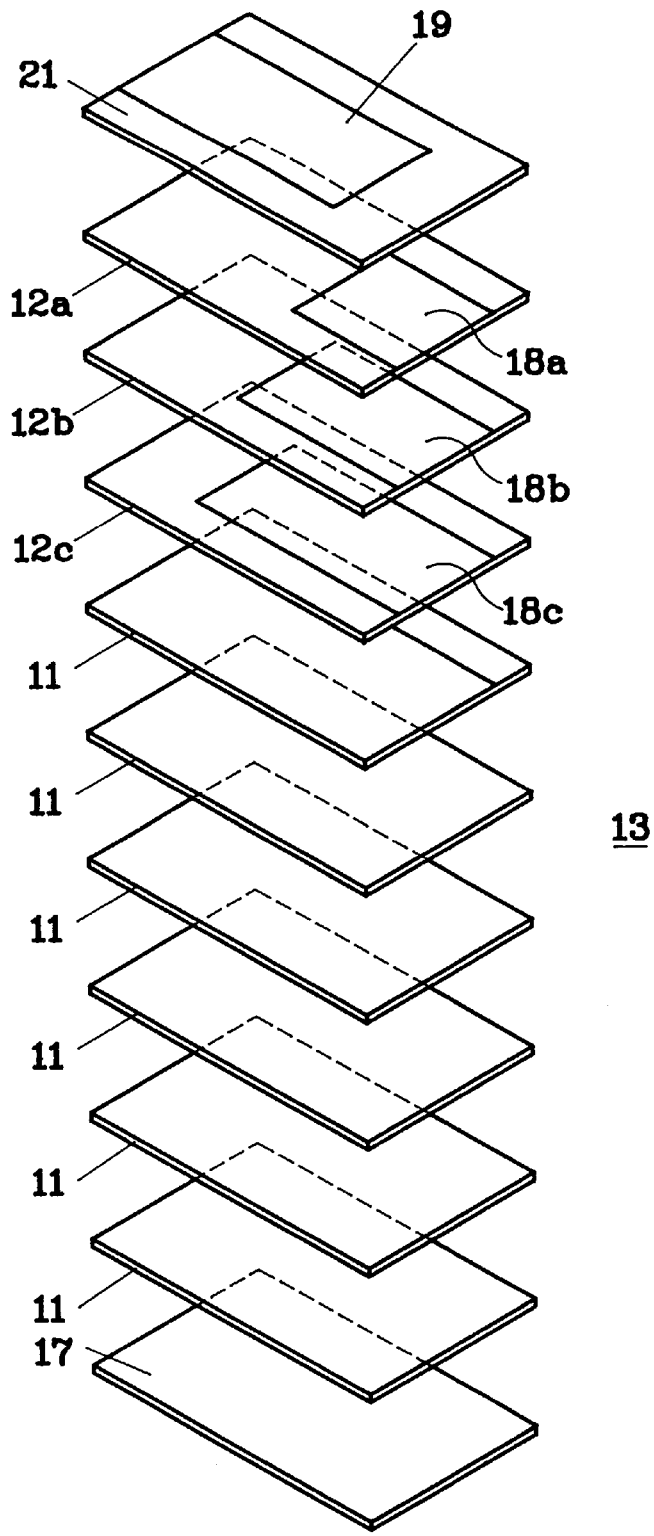
FIG. 3 is an exploded perspective view for showing the laminated construction of a naked laminated body in the example of the same laminated capacitor.

The naked laminated body 13 is constructed with ceramic layers 11, 11 . . . piled up in a plurality thereof, each of which is made of a dielectric material without the internal electrode shown in FIG. 3., and further thereon is piled ceramic layers 12a, 12b, 12c on which surfaces are printed internal electrodes 18a, 18b, 18c for adjusting. Further, on both sides of it, ceramic layers 17, 21 not having an internal electrode are piled up respectively. As to the adjusting internal electrodes 18a, 18b, 18c, those which are formed on the ceramic layers 12a, 12b at an upper side are shorter than those formed on the ceramic layers 12b, 12c at a lower side thereof. The adjusting electrodes 18a, 18b, 18c extend out onto an end surface of the naked laminated body 13. Further, the ceramic layer at the top is an adjusting layer 21.

Figure 4:
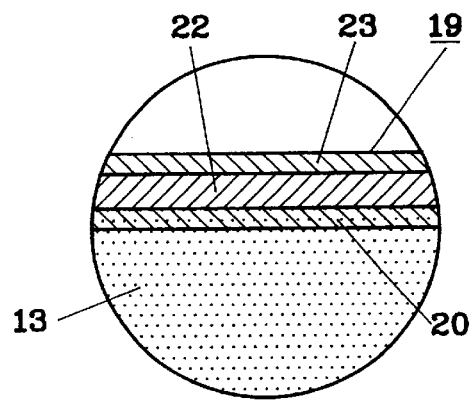
FIG. 4 is an enlarged cross-sectional view showing portion A in FIG. 1.

A trimming electrode 19 is formed on the surface of the naked laminated body 13, i.e., on the ceramic layer to be used as the adjusting surface 21. In more detail, first of all, a protective layer 20 as shown in FIG. 4 is formed by printing a paste of a mixture including the powder of a conductive component such as Pd, etc., and the same ceramic powder forming the naked laminated body 13, and then baking. Next, on the surface of it, a conductive paste including the powder of a conductive material such as Pd is printed and baked to form a thick conductive layer 22. Further, the surface is treated with Au plating to form a thin conductive layer 23. The thick conductive layer 22 and thin conductive layer 23 together form a trimming electrode 19. Further, the thick conductive layer 22 can be provided in the vicinity of the surface of the naked laminated body 13 in the inside thereof, under the condition that it is covered with a thin ceramic film or other insulating layer. However, in that case, it is impossible to form the thin conductive layer 23.

Figure 2:
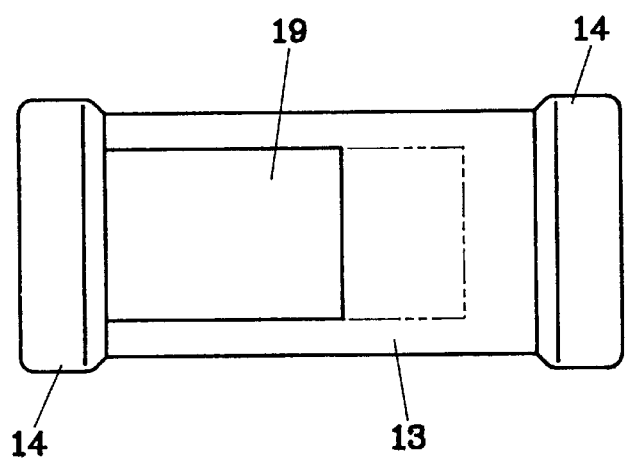
FIG. 2 is a top plane view for showing an example of the same laminated capacitor after the trimming process.

As is apparent from FIG. 2, the trimming electrode 19 is formed so as to be extended outside onto an end surface of the naked laminated body 13, on the opposing end surface of which are extended outside the adjusting internal electrodes 18a, 18b, 18c.

Figure 1:
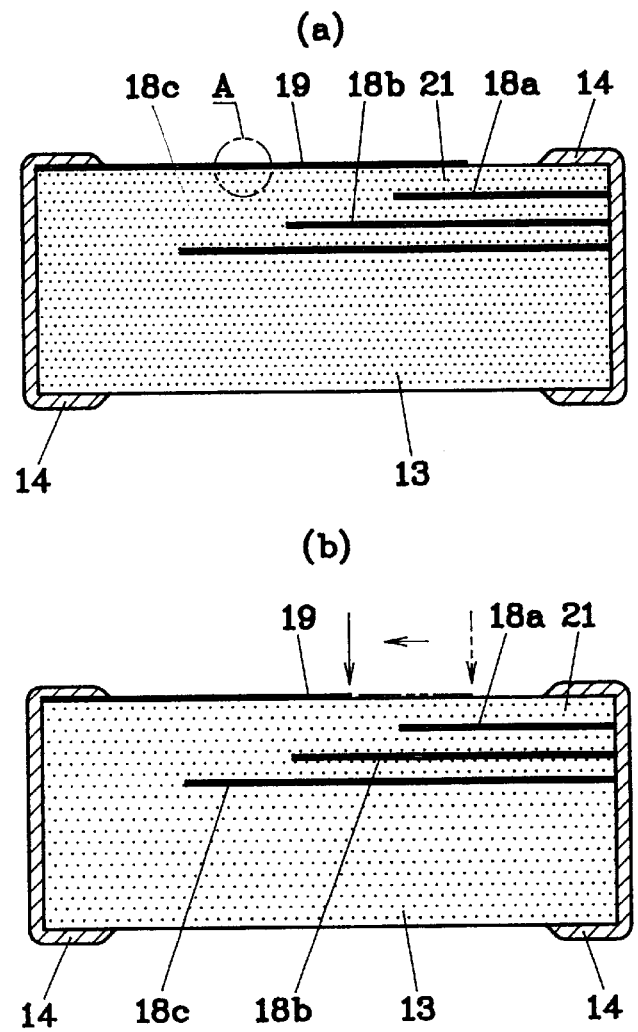
FIGS. 1(a) and (b) are vertical cross-sectional side views for showing an example of a laminated capacitor in accordance with the present invention before and after a trimming process.

Moreover, as shown in FIG. 1(a), a conductive paste, such as Ag paste, is pasted on both of those end surfaces of the naked laminated body 13, onto which surfaces are extended outside the adjusting internal electrodes 18a, 18b, 18c and the trimming electrode 19, respectively. This is baked to be formed with external electrodes 14 and 14. Thereby, it is completed as a laminated capacitor. One of the external electrodes 14 and 14 is connected to the adjusting internal electrodes 18a, 18b, 18c, and the other to the trimming electrode 19.

In this embodiment, though the trimming electrode 19 and the external electrodes 14 and 14 are formed separately from each other, however, they can be formed at the same time and of the same material.

With the laminated capacitor of this construction, since the trimming electrode 19 is confronting or opposing the plurality of adjusting internal electrodes 18a, 18b, 18c, therefore, an electrostatic capacity can be obtained between the external electrodes 14 and 14. Each of the plurality of adjusting internal electrodes 18a, 18b, 18c has respective areas opposing the trimming electrode 19 which are different from one another, for instance, the nearer to the trimming electrode 19, the smaller in the area in the embodiment. In other words, with the adjusting electrodes 18a, 18b, 18c, the farther from the trimming electrode 19, the greater the area opposing the trimming electrode 19.

Further, the adjusting internal electrodes 18a, 18b, 18c can be different not only in the length but also in the width thereof.

In the trimming method of the laminated capacitor, as shown by an arrow in FIG. 1(b), a laser beam is irradiated upon a portion of the trimming electrode 19. Thereby, as shown in FIG. 1(b) and FIG. 2, a portion of the trimming electrode 19 is removed. At this time, the trimming electrode 19 is removed from the top portion opposing to many of the adjusting internal electrodes 18a, 18b, 18c toward the base portion which is connected to the external electrode 14. The portion of the trimming electrode 19 which is removed is shown by a two-dotted line in FIG. 1(b) and FIG. 2.

By doing so, the opposing area where the trimming electrode 19 and the each adjusting electrode 18a, 18b, 18c are facing or opposing is reduced as well as in the number thereof. Thereby, at an initial stage of the trimming process, a proportion or the rate of reduction in the electrostatic capacity is relatively large with respect to that rate of the trimming electrode 19. The number of adjusting electrodes 18a, 18b, 18c opposing the trimming electrode 19 is decreased in accordance with the progress of the trimming process, and the distances of them opposing the trimming electrode 19 becomes longer, therefore, the rate of reduction in the electrostatic capacity reduces gradually with respect to the rate of the trimming electrode 19.

Figure 7:
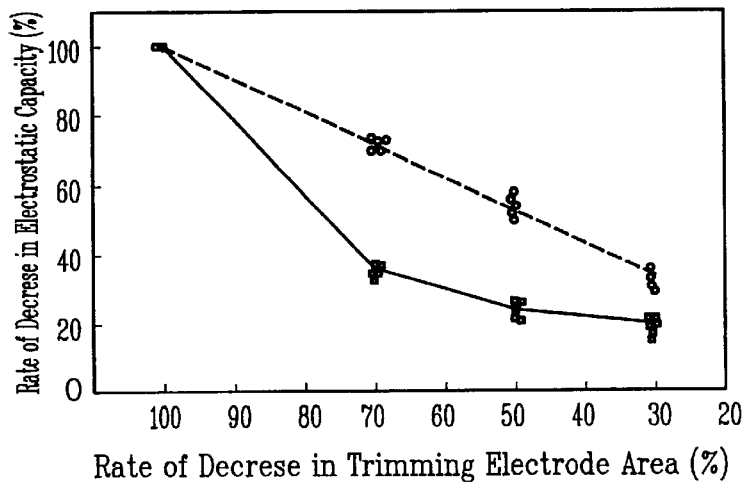
FIG. 7 is a graph showing the relationships between the proportion in reduction in area of the trimming electrode and that of the electrostatic capacity in the example of the above-mentioned capacitor and an example for comparison.
Figure 8:
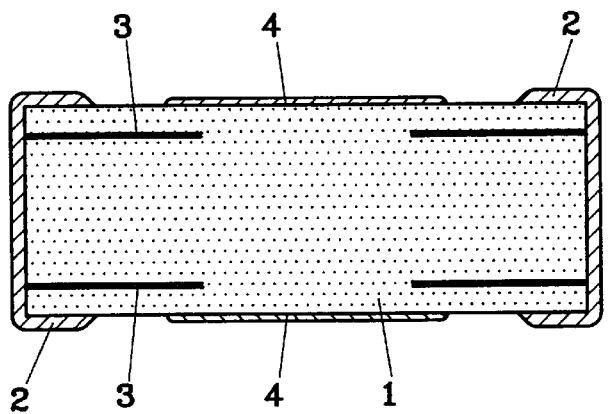
FIG. 8 is a vertical cross-sectional side view showing an example of a laminated capacitor in accordance with the conventional art before the trimming process.
Figure 9:
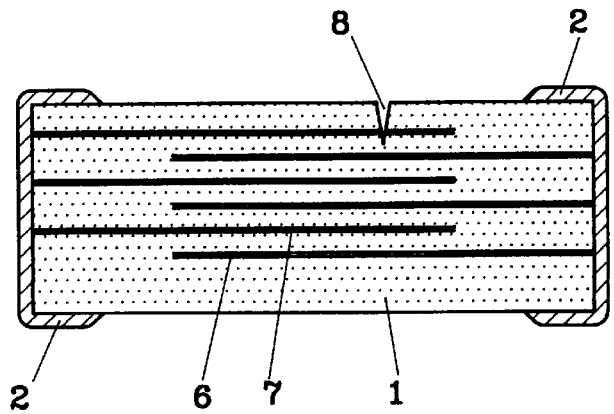
FIG. 9 is a vertical cross-sectional side view showing another example of another laminated capacitor in accordance with the conventional art after the trimming process.

A graph depicted by a solid line in FIG. 7 shows an example of a relationship between the rate of reduction in the area of the trimming electrode 19 and the electrostatic capacity thereof when the trimming electrode 19 of the laminated capacitor is treated with the trimming process in the manner mentioned above. It is indicated by assuming that the area of the trimming electrode 19 and the electrostatic capacitor are at 100% before the trimming process is started.

Figure 11:
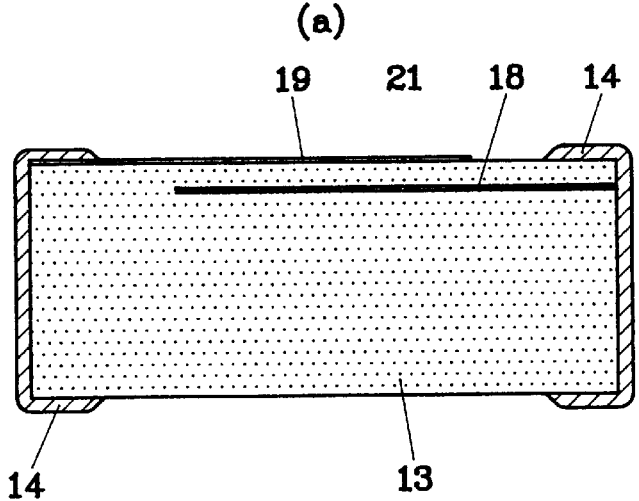
FIGS. 11(a) and (b) are vertical cross-sectional side views showing conditions in the example for comparison of the above-mentioned laminated capacitor before and after the trimming process.
Figure 11:
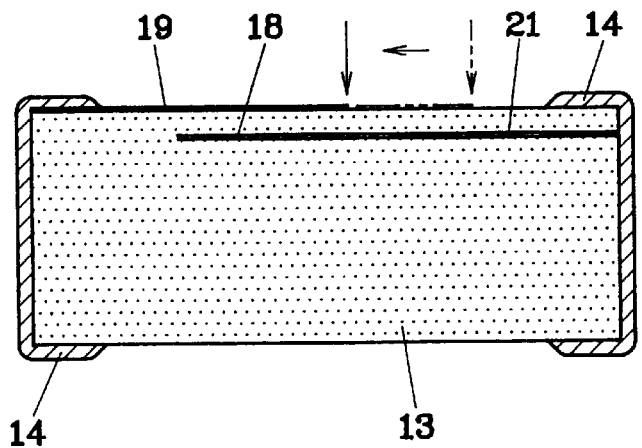

Further, a graph depicted by a broken line in FIG. 7 shows an example of a relationship between the rate of reduction in the area of the trimming electrode 19 and the electrostatic capacity thereof, when the trimming electrode 19 of the laminated capacitor is treated with the trimming process in the same manner as mentioned above, by using the laminated capacitor as shown in FIG. 11(a) for comparison, in the manner as shown in FIG. 11(b). In this comparison, there is one internal adjusting electrode 18.

As apparent from the graphs shown in FIG. 7, with the exemplar of the capacitor for comparison of the latter shown by the broken line therein, the rate of reducing in the area of the trimming electrode 19 is almost completely proportional to that of the electrostatic capacity thereof when the trimming electrode 19 of the laminated capacitor is treated with the trimming process, and it changes linearly. Contrary to this, with the exemplar of the former in accordance with the present invention as shown by the solid line therein, the rate of reducing in the area of the trimming electrode 19 is not proportional to that of the electrostatic capacity thereof when the trimming electrode 19 of the laminated capacitor is treated with the trimming process. Namely, the reducing rate in the electrostatic capacity is large at the initial stage of the trimming process, and it decreased in accordance with the progress of the trimming process.

A laser beam which is used for the trimming process is preferred to have a wavelength less than that of a visible ray of light, such as an excimer laser, etc. With this, the naked laminated body 13 can be protected from deoxidization during the trimming process. Further, the protection layer 20 (see FIG. 4) provided between the trimming electrode 19 and the naked laminated body 13 functions as a damper band with respect to the laser beam so as to prevent the naked laminated body 13 from deoxidization. Moreover, for the trimming process, not only a laser beam but also a mechanical process, such as sandblasting or other methods can be used.

Figure 5:
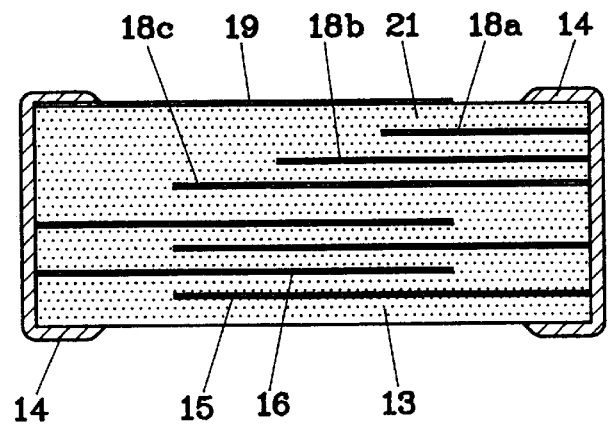
FIG. 5 is a vertical cross-sectional side view showing another example of the same laminated capacitor in accordance with the present invention before the trimming process.

In another example of the laminated capacitor which is shown in FIG. 5, at least a pair of internal electrodes 15 and 16 are provided in the naked laminated body 13, opposing each other through the dielectric ceramic layer thereof, and they extend outside onto the end surfaces of the naked laminated body 13 opposing each. other, respectively, thereby connecting with the external electrodes 14 and 14.

The aspect of the trimming electrode 19 and the plurality of internal adjusting electrodes 18a, 18b, 18c opposing it formed within the naked laminated body 13 and other aspects are the same as the example previously mentioned above. Further, the trimming process is also the same as that mentioned above.

This laminated capacitor can be represented by an equivalent circuit in which the electrostatic capacity obtained by opposing the internal electrodes 15 and 16 to each other through the dielectric ceramic layer and that obtained by opposing the trimming electrode 19 and the adjusting internal electrodes 18a, 18b, 18c are connected in parallel through the external electrodes 14 and 14. Since the internal electrodes 15 and 16 are provided biased to the opposing side at which the trimming electrode 19 is formed, and are apart from the trimming electrode 19, they hardly form an electrostatic capacity between the same trimming electrode 19. Therefore, the electrostatic capacity which is obtained by trimming the trimming electrode 19 opposing the internal electrodes 15 and 16 hardly changes, thereby obtaining a fixed electrostatic capacity.

Figure 6:
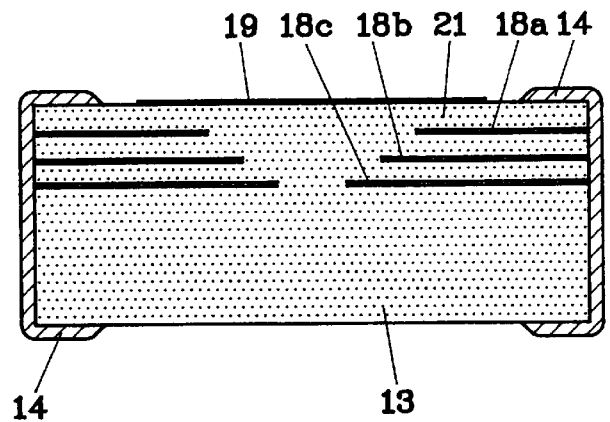
FIG. 6 is a vertical cross-sectional side view showing a further example of the same laminated capacitor in accordance with the present invention before the trimming process.

In a further example of the laminated capacitor shown in FIG. 6, the trimming electrode 19 which is formed on a surface of the naked laminated body 13 is not connected with the external electrode 14 and 14 thereof, thereby they are provided in the condition of being insulated. Further, two sets of the adjusting internal electrodes 18a, 18b, 18c are provided in the inside of the naked laminated body 13, and each set of the adjusting internal electrodes 18a, 18b, 18c is connected to the respective other external electrodes 14 and 14 which are provided on the opposing end surfaces of the naked laminated body 13. The farther one of the adjusting internal electrodes 18a, 18b, 18c is from the trimming electrode 19, the longer in the length thereof, thereby being larger in the area which is opposed to the trimming electrode 19. Other aspects than that are the same as those of the example mentioned above.

This laminated capacitor can be represented by an equivalent circuit in which the electrostatic capacities obtained among the trimming electrode 19 and the two sets of adjusting internal electrodes 18a, 18b, 18c are connected in series through the trimming electrode 19.

With this laminated capacitor, the laser beam is irradiated upon the trimming electrodes 19 so as to remove it by the trimming process from the right-hand side edge or the left-hand side edge up to the center portion thereof in FIG. 6. With this, in the same manner as the example mentioned above, the rate of reduction in the electrostatic capacity is large with respect to that of the trimming electrode 19 at the initial stage of the trimming process, and it gradually decreases in accordance with the progress of the trimming process.

Figure 10:
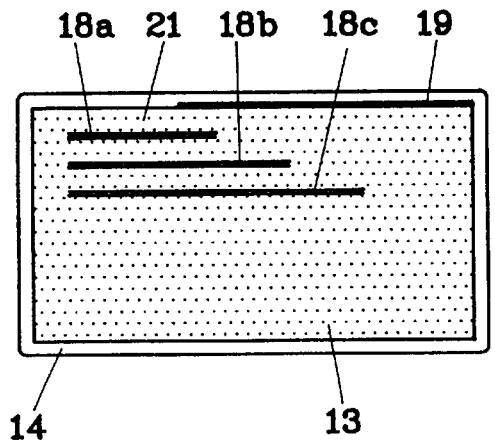
FIG. 10 is a vertical cross-sectional side view showing another example of the same laminated capacitor in accordance with the present invention before the trimming process.

In a further example of the laminated capacitor shown in FIG. 10, although the adjusting internal electrodes 18a, 18b, 18c are different in length thereof in the examples mentioned above, they are also different from one another in the width thereof. The internal electrodes 18a, 18b, 18c are connected to one of the external electrodes 14 of the naked laminated body 13. The farther one of the adjusting internal electrodes 18a, 18b, 18c is from the trimming electrode 19, the wider in the width thereof, thereby being larger as much in the area which is opposing to the trimming electrode 19. Other aspects than that are the same as the example mentioned above.

With this laminated capacitor, it is preferable to remove the trimming electrode 19 by the trimming process from the left-hand side towards the right-hand side in FIG. 10. By conducting the trimming process in this manner, it is possible to change the rate of reduction in the electrostatic capacity in such manner that it is large at the initial stage of the trimming process and it gradually decreases in accordance with the progress of the trimming process.

Further, the adjusting internal electrodes 18a, 18b, 18c can be changed not only in the width but also in the length thereof.

Figure 12:
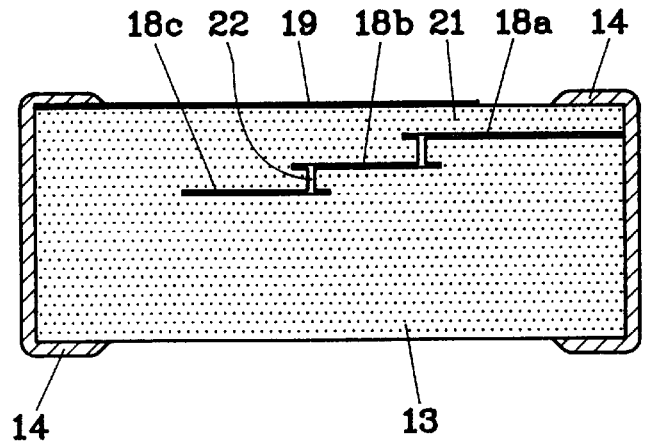
FIG. 12 is a vertical cross-sectional top view showing a further example of the same laminated capacitor in accordance with the present invention before the trimming process.

FIG. 12 shows a further example of the laminated capacitor. Although all the adjusting internal electrodes 18a, 18b, 18c are connected to the one external electrode 14 by contacting therewith in the example shown in FIG. 1, however, in this example, the adjusting internal electrodes 18a, 18b, 18c are connected to one another through a so-called through-hole conductor 22 penetrating through the ceramic layer of the naked laminated body 13. In this laminated capacitor, it is not necessary that all the adjusting internal electrodes 18a, 18b, 18c are connected with the one external electrode 14, and in the example in FIG. 12, only one adjusting internal electrode 18a is connected with the external electrode 14. The other adjusting internal electrodes 18b, 18c are connected to the external electrode 14 through the through-hole conductor 22.

Also, with this laminated capacitor, it is possible to change the rate of reduction in the electrostatic capacity in such manner that it is large at the initial stage of the trimming process and it gradually decreases in accordance with the progress of the trimming process by trimming the trimming electrode 19 in the same manner as in the laminated capacitor in FIG. 2 which is mentioned above.

Next, a trimming process for recovery will be explained, in particular, if the trimming electrode 19 of the laminated capacitor is treated by trimming and the electrostatic capacity thereof is reduced too much compared to a desired value thereof.

Figure 13:
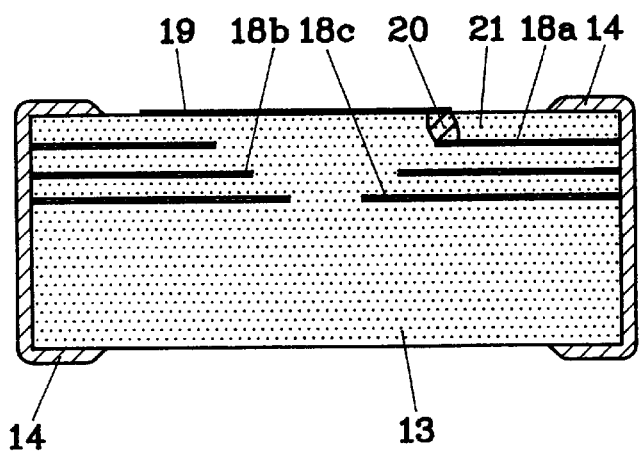
FIG. 13 is a vertical cross-sectional top view showing an example of the same laminated capacitor in accordance with the present invention after treating the trimming for increasing the electrostatic capacity thereof.

For example, as shown in FIG. 1(b), when the electrostatic capacity is decreased below the desired value thereof as the result of excessive trimming of the trimming electrode 19 of the laminated capacitor, a laser beam from a Nd-YAG laser, etc., is irradiated upon an edge portion of the trimming electrode 19 which has been treated by the trimming process. According to this, as shown in FIG. 13, an adjusting layer 21 of the trimming electrode 19 is deoxidized in a part thereof to be turned conductive, thereby the trimming electrode 19 and the internal electrode 18a are short-circuited. A reference numeral 20 indicates that short-circuited portion. With this portion, the internal electrode 18a and the trimming electrode 19 are short-circuited, thereby the capacity obtained between the trimming electrode 19 and the internal electrode 18 is about doubled, compared to that of the capacitor before the trimming process. Namely, the electrostatic capacity defined between the external electrodes 14 and 14 increases as much.

For making the deoxidation of the adjusting layer 21 easy by the irradiation of the laser beam, a valence-controlling material can be included in at least in the trimming electrode 19 or in a boundary surface between the trimming electrode 19 and the adjusting layer 21. For instance, an oxide of a metal which has a valence larger than that of the metal contained in the ceramic material is added. That is, an oxide of Nb of a pentavalent (5-valent) metal is added for Ti of a tetravalent (4-valent) metal in BaTiO3, or an oxide of La of a trivalent (3-valent) metal is added to Ba of a divalent (2-valent) metal. Thereby, since a free electron is generated in the adjusting layer 21 when the trimming is treated, it is turned conductive easily.

Further, the valence-controlling material mentioned above can be added into the ceramic material for forming the naked laminated body 13 in advance. Further, this valence-controlling material can be added to only the ceramic green sheet for forming the adjusting layer 21. In this case, the valence-controlling material to be added to the ceramic material is 0.5 mol % at the most, and ordinarily, it can be added at 0.05 mol % and more or less.

After increasing the electrostatic capacity of the laminated capacitor in this way, for decreasing the electrostatic capacity value thereof, the laser beam is irradiated onto the trimming electrode 19 to remove a part thereof. Thereby, the area where the trimming electrode 19 and the internal electrode 18 oppose each other is reduced and the electrostatic capacity defined therebetween is also decreased. In this moment, since the trimming electrode 19 is not short-circuited, it is important that the trimming process is carried out by setting the laser beam at an output power lower than that during the trimming process mentioned above, for the purpose of preventing the internal electrode 18 and the trimming electrode 19 from being short-circuited to each other. For example, it is possible to remove the trimming electrode 19 without heating it so much, by using a laser beam of a wavelength shorter than that of visible light, such as an excimer laser, etc., as the laser beam for use in the trimming process. Therefore, the area of only the trimming area 19 can be reduced without causing deoxidization in the adjusting layer 21. Further, since this trimming process is treated only for the purpose of reducing the trimming electrode 19, it can be replaced by another trimming process, such as sandblasting, etc.

Figure 14:
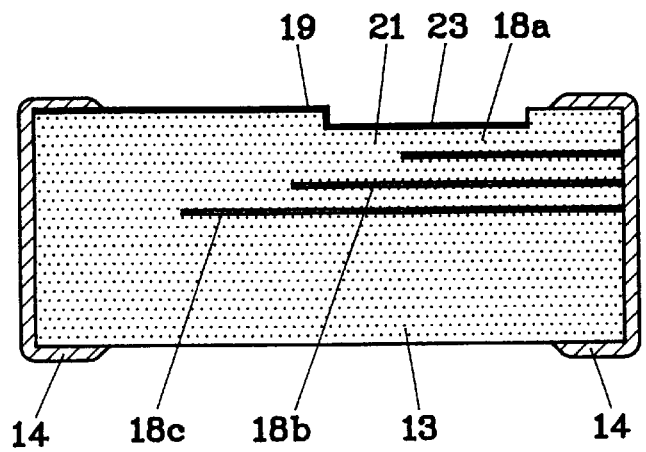
FIG. 14 is a vertical cross-sectional top view showing another example of the same laminated capacitor in accordance with the present invention after treating the trimming process for increasing the electrostatic capacity thereof.

Next, another trimming method of the laminated capacitor is shown in FIG. 14. In this method of trimming of the laminated capacitor, the laser beam from such as an Nd-YAG laser, etc., is irradiated upon a part of the trimming electrode 19. By this, as shown in FIG. 15, a portion of the adjusting layer 21 is removed as well as it is deoxidized to be turned conductive. Reference numeral 23 shows the conductive layer which is partially changed into an electrically conductive body in the removed portion.

With this, as shown in FIG. 14, the distance between the internal electrode 18a and the trimming electrode 19 is substantially narrowed. As a result of this, the capacity obtained between the trimming electrode 19 and the internal electrode 18a becomes larger than that of before the trimming thereof, thereby increasing the electrostatic capacity between the external electrodes 14 and 14 as much.

Thereafter, if necessary, the trimming process for decreasing the area of the trimming electrode 19 as mentioned in the above is conducted.

What is claimed is:

1. A laminated capacitor having a naked laminated body and at least a pair of external electrodes attached at end portions of said naked laminated body, comprising:

a plurality of adjusting internal electrodes formed within said naked laminated body and connected to one of said pair of external electrodes; and a trimming electrode formed on or in the vicinity of a surface of said naked laminated body opposed to said plurality of adjusting internal electrodes and connected to the other of said pair of external electrodes, wherein said plurality of adjusting internal electrodes differ from one another in area thereof opposed to said trimming electrode respectively.

2. A laminated capacitor as described in claim 1, wherein said plurality of adjusting internal electrodes opposed to said trimming electrode are arranged in such manner that the nearer to said trimming electrode, the smaller the area thereof.

3. A laminated capacitor as described in claim 1, wherein said plurality of adjusting internal electrodes are different from one another in length thereof.

4. A laminated capacitor as described in claim 1, wherein said plurality of adjusting internal electrodes are different from one another in width thereof.

5. A laminated capacitor as described in claim 1, wherein a protective layer containing a conductive material for forming said trimming electrode and a ceramic material for forming said naked laminated body is laminated between said trimming electrode and said naked laminated body.

6. A laminated capacitor as described in claim 1, wherein internal electrodes opposed to each other without obtaining an electrostatic capacity therebetween are provided within said naked laminated body together with said plurality of adjusting internal electrodes.

7. A trimming process of said laminated capacitor as described in claim 1, wherein said trimming electrode is removed from a portion where it opposes more of said adjusting internal electrodes toward another portion where it opposes less of said adjusting internal electrodes.

8. A trimming process of said laminated capacitor as described in claim 7, wherein said trimming electrode is removed by irradiating a laser beam thereon.

9. A laminated capacitor as described in claim 1, wherein, an adjusting layer which is deoxidized by irradiation of a laser beam onto said trimming electrode is provided between said trimming electrode and said internal electrode.

10. A laminated capacitor as described in claim 9, wherein said adjusting layer forms a layer which is deoxidized and removed by the irradiation of the laser beam.

11. A laminated capacitor as described in claim 1, wherein a valence controlling material is contained in a boundary surface to said trimming electrode or between said trimming electrode and said adjusting layer.

12. A laminated capacitor as described in claim 1, wherein a valence controlling material is contained in at least said adjusting layer of said naked laminated body.

13. A laminated capacitor having a naked laminated body and a plurality of external electrodes attached at end portions of said naked laminated body, comprising:

a plurality of adjusting internal electrodes formed within said naked laminated body and connected to one of said plurality of external electrodes;

a plurality of adjusting internal electrodes formed within said naked laminated body and conducted to the other of said plurality of external electrodes; and a trimming electrode formed on or in vicinity of a surface of said naked laminated body opposed to said plurality of adjusting internal electrodes and insulated from said plurality of external electrodes, wherein said plurality of adjusting internal electrodes differ from one another in area thereof opposed to said trimming electrode respectively.

14. A laminated capacitor having a naked laminated body including internal electrodes and external electrodes attached at end portions of said naked laminated body, comprising:

a trimming electrode formed on or in vicinity of a surface of said naked laminated body opposed to at least a pair of said internal electrodes formed within said naked laminated body; and an adjusting layer to be deoxidized by irradiation of a laser beam and positioned between said trimming electrode and said internal electrodes, wherein said adjusting layer is deoxidized in a part thereof by the irradiation of the laser beam on said trimming electrode, thereby connecting said trimming electrode and a part of an internal electrode to each other.

15. A laminated capacitor having a naked laminated body including internal electrodes and external electrodes attached at end portions of said naked laminated body, comprising:

a trimming electrode formed on or in the vicinity of a surface of said naked laminated body opposed to at least a pair of said internal electrodes which is formed within said naked laminated body; and an adjusting layer to be deoxidized by irradiation of a laser beam and positioned between said trimming electrode and said internal electrodes, wherein said adjusting layer is removed at a part thereof and deoxidized by the irradiation of the laser beam on said trimming electrode, to become conductive.

* * * * *

UNITED STATES PATENT AND TRADEMARK OFFICE
CERTIFICATE OF CORRECTION

PATENT NO.   : 6 069 786
DATED        : May 30, 2000
INVENTORS    : Katsuyuki HORIE et al It is certified that error appears in the above-identified patent and that said Letters Patent are hereby corrected as shown below:

Column 12,   line 60;   change "valence controlling" to ---valence-controlling---.

line 64;   change "valence controlling" to ---valence-controlling---.

Column 13,   line 5;    change "conducted to the other" to ---connected to the other---.

Signed and Sealed this

Fifteenth Day of May, 2001

Attest:

NICHOLAS P. GODICI

Attesting Officer      Acting Director of the United States Patent and Trademark Office